(12) United States Patent
Pomerantz

(10) Patent No.: US 8,365,089 B2
(45) Date of Patent: Jan. 29, 2013

(54) AUTOMATIC DEFAULTS PROXY FOR WEB-DELIVERED SERVICES

(75) Inventor: Ori Pomerantz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1054 days.

(21) Appl. No.: 11/958,095

(22) Filed: Dec. 17, 2007

(65) Prior Publication Data

US 2009/0158195 A1 Jun. 18, 2009

(51) Int. Cl.
*G06F 3/048* (2006.01)
(52) U.S. Cl. ............ 715/780; 715/220; 715/224
(58) Field of Classification Search .......... 715/760, 715/750, 733, 738, 742, 743, 745, 780, 220–224
See application file for complete search history.

(56) References Cited

U.S. PATENT DOCUMENTS

| 6,640,238 | B1 * | 10/2003 | Bowman-Amuah | 709/201 |
|---|---|---|---|---|
| 7,191,404 | B2 * | 3/2007 | Barker et al. | 715/760 |
| 7,519,969 | B2 * | 4/2009 | Bent et al. | 719/315 |
| 7,672,877 | B1 * | 3/2010 | Acton et al. | 705/26.1 |
| 7,831,918 | B2 * | 11/2010 | Marini | 715/762 |
| 7,886,284 | B2 * | 2/2011 | Haven et al. | 717/138 |
| 2003/0065874 | A1 * | 4/2003 | Marron et al. | 711/100 |
| 2003/0208530 | A1 * | 11/2003 | Bhogal et al. | 709/203 |
| 2006/0020586 | A1 * | 1/2006 | Prompt et al. | 707/3 |
| 2006/0075120 | A1 * | 4/2006 | Smit | 709/227 |

FOREIGN PATENT DOCUMENTS

| EP | 0825516 A3 | 7/2001 |
|---|---|---|
| EP | 1777629 A1 | 4/2007 |
| WO | WO 2004/092979 A2 | 10/2004 |

OTHER PUBLICATIONS

Koutsonikola,et al. LDAP: Framework, Practices, and Trends. 1089-7801/04/$20.00 © 2004 IEEE.*
Kobosa et al. An LDAP-based user modeling server and its evaluation. User Model Adap Inter (2006) 16:129-169 DOI 10.1007/s11257-006-9006-5.*
Bazan et al. Rough Set Algorithms in Classification Problem. In: L. Polkowski, S. Tsumoto and T.Y. Lin (eds.): Rough Set Methods and Applications. Physica-Verlag, Heidelberg, New York 2000, pp. 49-88.*

* cited by examiner

*Primary Examiner* — Weilun Lo
*Assistant Examiner* — Amy M Levy
(74) *Attorney, Agent, or Firm* — Yudell Isidore Ng Russell PLLC

(57) ABSTRACT

A method, system and computer program product are presented for intercepting data entry by a proxy server to automatically define data entry fields in a webpage. The proxy server counts a number of instances in which a particular type of data is entered into each field in the webpage. If the number of instances exceeds a predetermined number for a specific field, then subsequent users are prompted to enter data of that particular type in that specific field.

15 Claims, 4 Drawing Sheets

AUTOMATIC DEFAULTS PROXY FOR WEB-DELIVERED SERVICES

BACKGROUND OF THE INVENTION

The present disclosure relates to the field of computers, and specifically to software that runs on computers. Still more specifically, the present disclosure relates to populating fields on a webpage.

BRIEF SUMMARY OF THE INVENTION

A method, system and computer program product are presented for intercepting data entry by a proxy server to automatically define data entry fields in a webpage. The proxy server determines a frequency, either of number of occurrences or percentage of occurrences, or instances in which a particular type of data is entered into each field in the webpage. If the frequency of instances exceeds a predetermined number for a specific field, then subsequent users are prompted to enter data of that particular type in that specific field.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

Figure 1:
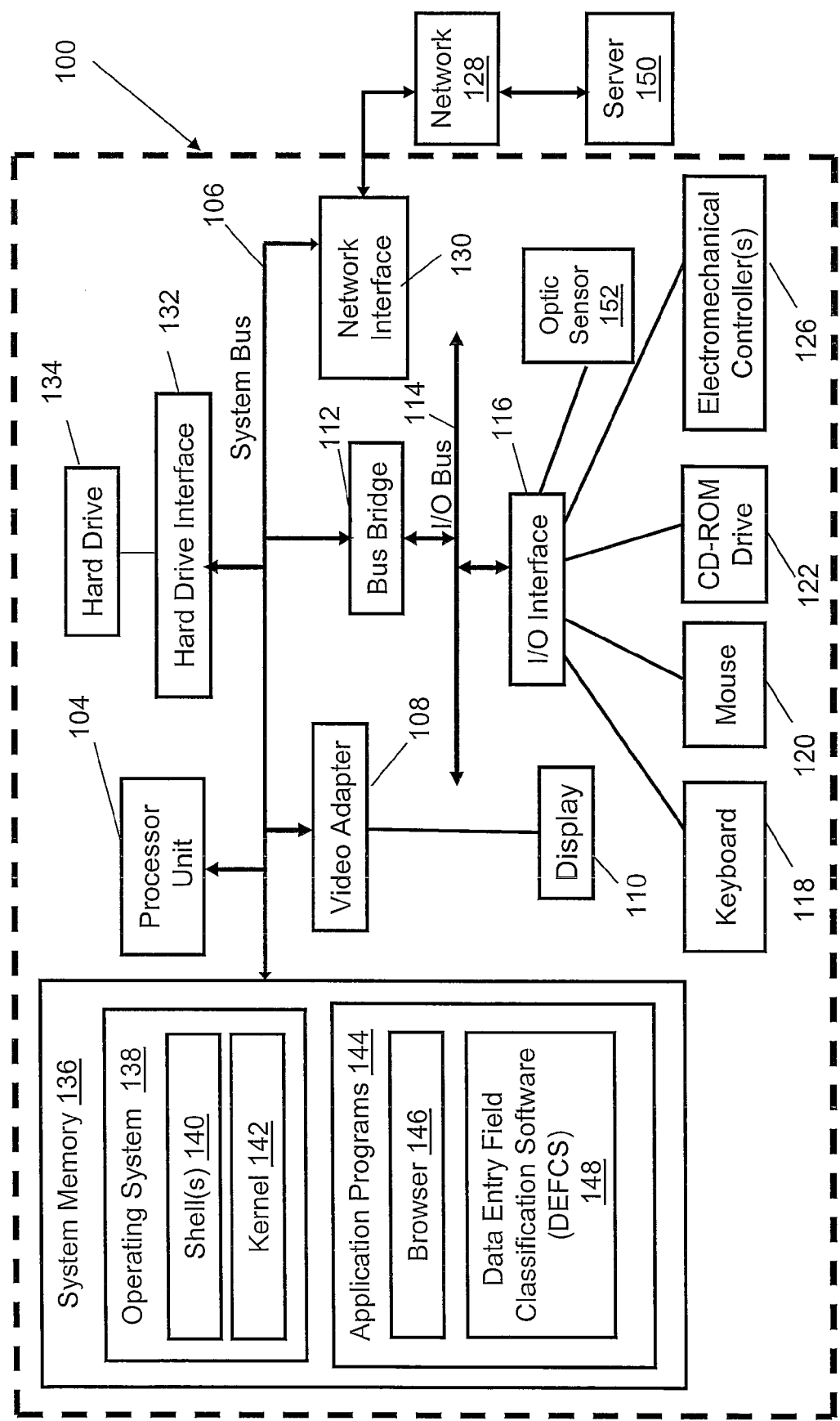
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java® (Java® is a trademark or registered trademark of Sun Microsystems, Inc. in the United States and other countries), Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, and a Compact Disk-Read Only Memory (CD-ROM) drive 122. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Data Entry Field Classification Software (DEFCS) 148, which includes instructions and data required to execute the processes and steps described below in FIGS. 2-4.

In one embodiment, computer 100 is able to download DEFCS 148 from a remote service provider server 150, preferably in an "on demand" basis. In another embodiment, server 150 is able to execute DEFCS 148, thus reducing demand on hardware and software resources directly attributed to computer 100.

Note that the architecture presented in computer 100 may be substantially utilized by user's computer 302, proxy server 306, and/or service provider's computer 304 shown below in FIG. 3.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Figure 2:
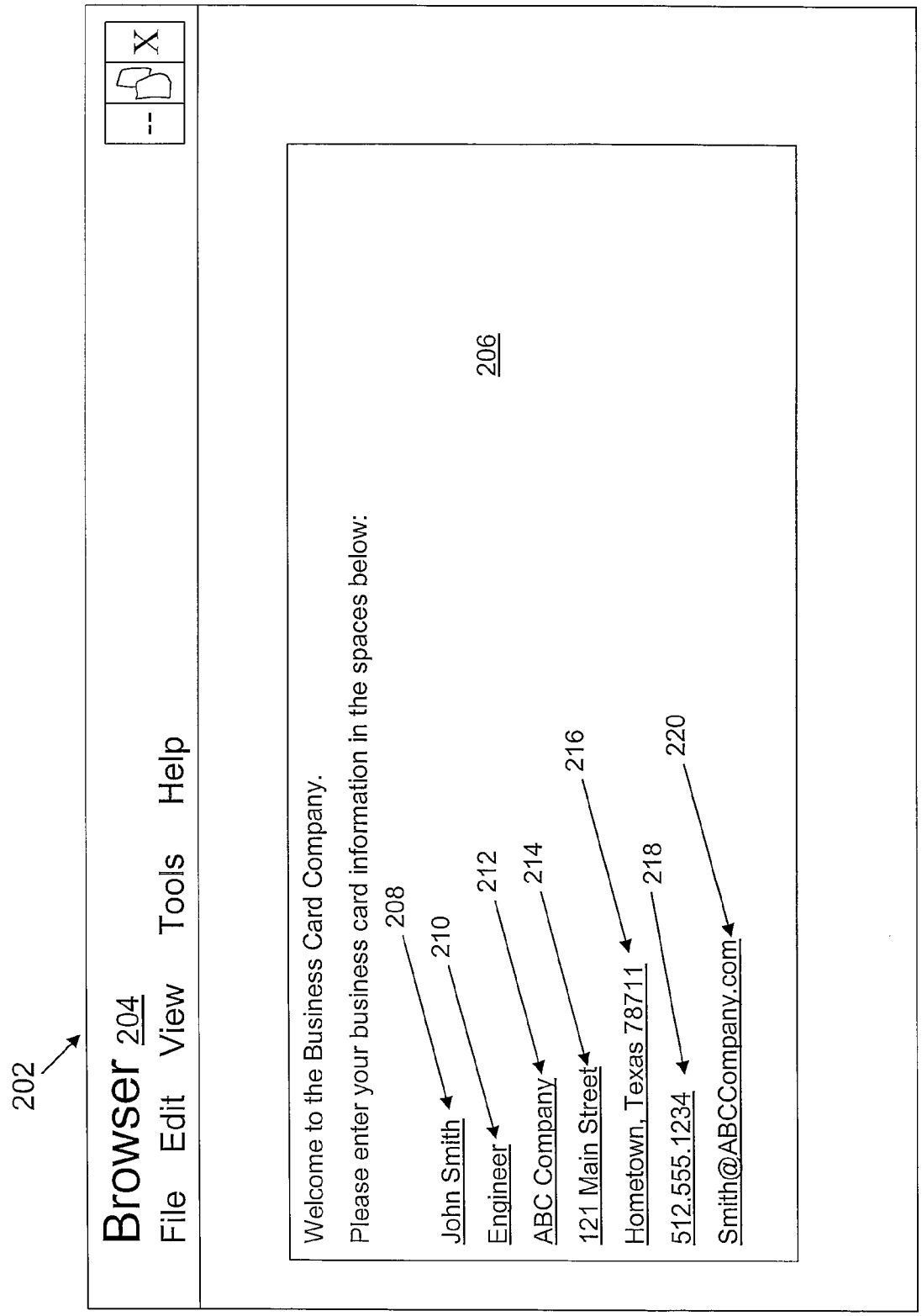
FIG. 2 illustrates an exemplary Graphical User Interface (GUI) that is presented to a user to populate fields on a webpage.

Referring now to FIG. 2, an exemplary Graphical User Interface (GUI) 202 for accepting data from a user is presented. GUI 202 is shown as associated with a browser 204, which retrieves and presents a webpage 206. Webpage 206 is created by a service provider's computer 304 (shown in FIG. 3). Browser 204 is running on a user's computer 302 (also shown in FIG. 3). Note that the webpage 206 has exemplary data entry fields 208-220. For purposes of explanation, assume that webpage 206 is used to order business cards, which are printed and sold by a business card company that uses service provider's computer 304. There may or may not be uniformity in how the customer's information on the business card is presented. Thus, an initial customer can fill out the data entry fields 208-220 with any data that he desires. In the example shown, the customer has elected to enter his common name in data entry field 208, his title in data entry field 210, his employer's name in data entry field 212, his work street address in data entry field 214, his work city, state and zip code in data entry field 216, his phone number in data entry field 218, and his e-mail address in data entry field 220.

Once the customer fills out the data entry fields 208-220 in the order that he chooses, the data entered is compared with a Lightweight Directory Access Protocol (LDAP) (e.g., LDAP 314 shown in FIG. 3), which is a directory that includes, but is not limited to, an employees name, title, employer's name, work street address, work city, state and zip code, phone number and e-mail address. By comparing the data entered in each of the data entry fields 208-220 with entries in that employee's LDAP file, the data entry classification for each of the data entry fields 208-220 is established as a default.

Figure 3:
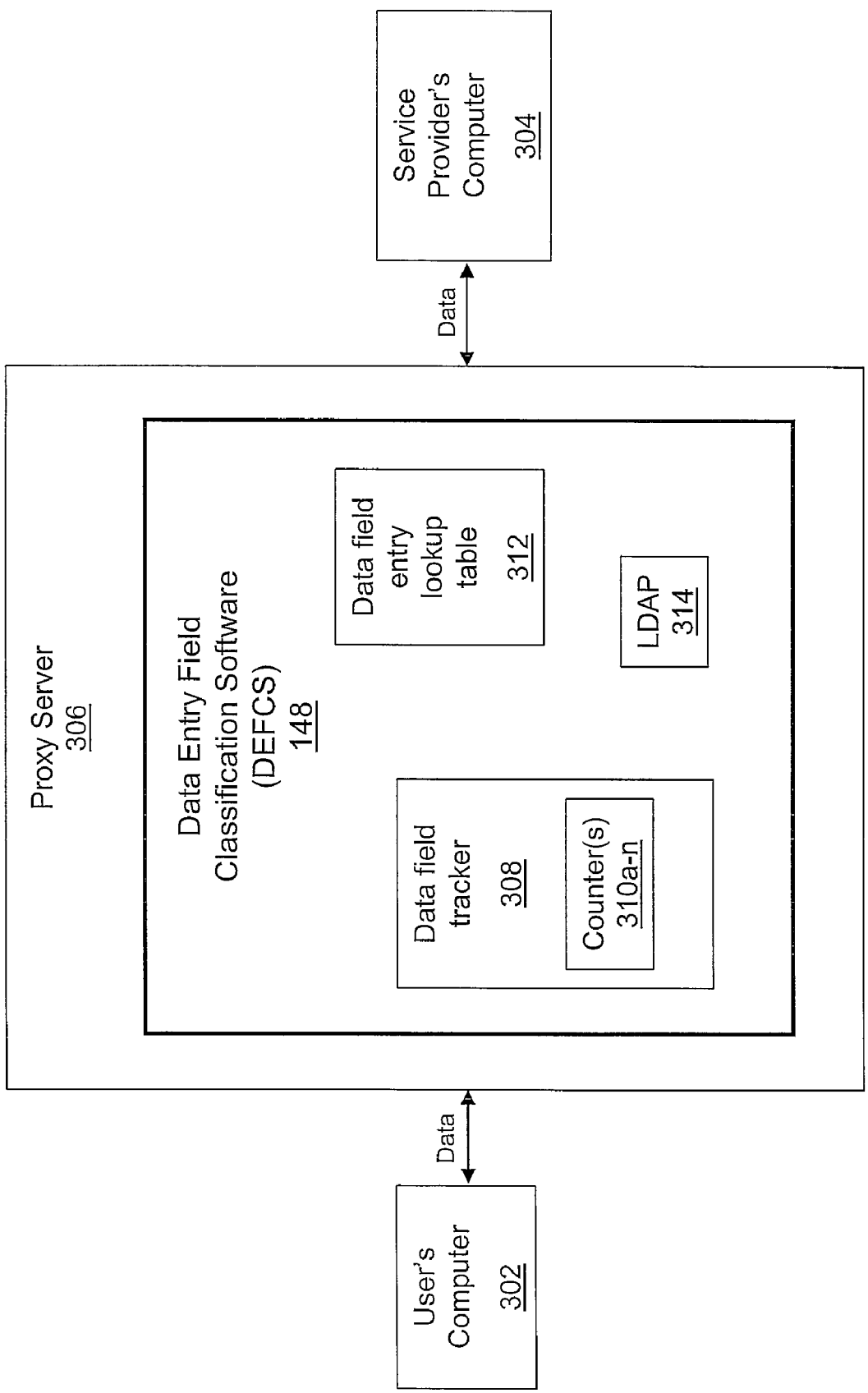
FIG. 3 depicts a relationship between a proxy server, a user's computer, and a service provider's computer.

With reference now to FIG. 3, user's computer 302 is shown coupled by a proxy server 306 to service provider's computer 304 that, as described above and for exemplary purposes, is utilized by the business card company that provided the webpage 206 (shown in FIG. 2) to a customer who is using the user's computer 302. In one embodiment, the proxy server 306 is operated by an employer of a user who is using the user's computer 302, thus providing security control over the process described herein. When the customer enters data into a data entry field in the webpage 206, that data is intercepted by the proxy server 306 and intermediately processed by the Data Entry Field Classification Software (DEFCS) 148. Under the control of DEFCS 148, when customer-entered data for a specific data field is intercepted by the proxy server 306, the DEFCS 148 examines the entered data for that specific data field. For example, assume that the DEFCS 148 is examining "John Smith" from data entry field 208 shown in FIG. 2. John Smith logged onto user's computer 302, and thus DEFCS 148 is able to pull up the LDAP entry for John Smith. DEFCS 148 is able to confirm that "John Smith" is in fact this user's common name in his LDAP file, and thus "Common Name" is deemed to be the appropriate data entry classification for data field 208. DEFCS 148 then compares the other entries in the other data entry fields 210-220 with the current user's LDAP file in LDAP 314 to create the default data entry classifications for these data entry fields.

In another embodiment, DEFCS 148 does not use an LDAP, but rather uses local rules and/or lookup tables. For example, DEFCS 148 can determine that each part of the data entry for data entry field 208 starts with a capital letter, and thus is likely to be an individual's common name, a company name, or an address. However, since there is no numeral in the field, the address is ruled out. Similarly, since there is no entry of "Company," "Inc.", "LLC," etc., and since the entry is the first entry in the webpage 206, DEFCS 148 determines (from a local rule that is part of DEFCS 148) that the entry is likely to be a user's common name. Thus, "Common Name" is determined to be the data entry classification for the first data field 208. Data field tracker 308 then increases a count for "Common Name" by one in one of the counters 310a-n (where each data field has its own counter from counters 310a-n, where "n" is an integer), indicating that "Common Name" has been determined (initially or once again) to be the data entry classification for data to be entered into the first data field 208.

Similar evaluations are made by DEFCS 148 for other data entry fields in the webpage 206. For example, DEFCS 148 compares the entry of "Engineer" from data entry field 210 with stored job titles in a data entry lookup table 310. Finding "Engineer" as an example of a "Job title" stored in this data entry lookup table 310, DEFCS 148 concludes that "Job title" is an appropriate data entry classification for data entry field 210, and data field tracker 308 increases a counter (associated with data entry field 210) from counters 310a-n for "Job title" by one.

The entry for data entry field 212 is intercepted, and the term "Company" is identified in the entry "ABC Company," leading DEFCS 148 to determine that "Employer" is an appropriate data entry classification. The counter (for data entry field 212) from counters 310a-n for "Employer" is increased by one.

The entry for data entry field 214 is intercepted, and the format is identified as having both numerals ("123") as well as text ("Main Street"). DEFCS 148 thus concludes, from a local rile in DEFCS 148, that this is a street address, and the counter (for data entry field 214) from counters 310a-n for "Street Address" is increased by one.

The data for data entry field 216 is intercepted, and the format is identified as having a five digit numeral at the end of a text field having an intermediate comma, leading DEFCS 148 to determine (using a local rule in DEFCS 148) that this is a city, state and zip code entry, and that "City, State, Zip" is an appropriate data entry classification for data entry field 216. The counter (from counters 310a-n) for "City, State, Zip" (for data entry field 216) is increased by one.

The data for data entry field 218 is intercepted, and the format is identified as having seven or ten numerals. A local rule in DEFCS 148 identifies this as a phone number, and thus "Phone Number" is determined to be the correct data entry classification for data entry field 218, whose counter (from counters 310a-n) for "Phone Number" is increased by one.

The data for data entry field 220 is intercepted, and the format is identified as including the "@" symbol, leading DEFCS 148 to determine, by a local rule in DEFCS 148, that this field is an e-mail address. Thus, "E-mail Address" is determined to be the correct data entry classification for data entry field 220, and the corresponding counter (from counters 310a-n) for "E-mail Address" for data entry field 220 is increased by one.

Returning to FIG. 3, if LDAP 314 is utilized in a manner described above, then a counter is increased each time a subsequent user follows the format that was initially created by the first user's LDAP entry. That is, each time that a subsequent user uses the same data entry format as the first user, then counters (from counters 310a-n) that are associated with each of the data entry classifications are increased by one.

Figure 4:
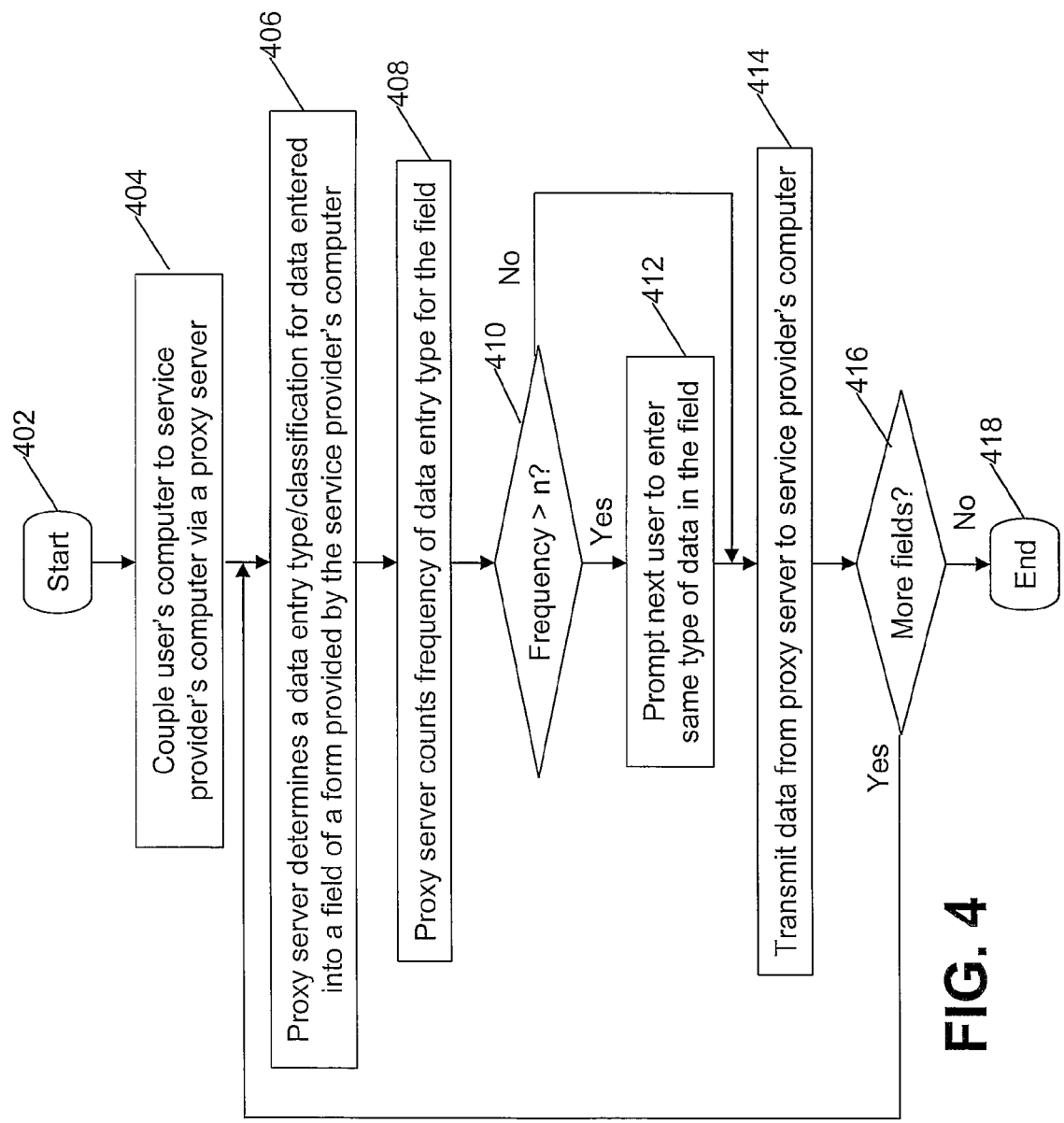
FIG. 4 is a high-level flow-chart of exemplary steps taken by the present invention to automatically define data entry types in the webpage shown in FIG. 2.

With reference now to FIG. 4, a high-level flow chart of exemplary steps taken to automatically define a data entry classification of data entry fields on a webpage is presented. After initiator block 402, a user's computer is coupled to a service provider's computer via a proxy server (block 404). The proxy server intercepts data that has been entered into a specific data entry field on a webpage that has been provided to the user's computer by the service provider's computer. The proxy server evaluates what type of data was entered for that specific data entry field (and thus, what type of data should be entered into that specific data entry field in the future), as indicated by block 406. This evaluation can be performed using the entries and attributes stored in an LDAP server, a local rule, or a lookup table, as described above.

Each time a particular data entry classification is determined for a particular data entry field, a counter for that particular data entry classification (and associated with the particular data entry field) is increased by one (block 408). If the total number of instances in which a particular data entry classification for a particular data entry field exceeds a predetermined number (query block 410), then subsequent future users are prompted (block 412) to enter the described type of data. For example, assume that multiple users have entered data that DEFCS 148 has determined to be a "Common Name" more than ten times, then webpage 206 (shown in FIG. 2) may be modified to include a text prompt (not shown) of "Please enter your common name" next to data entry field 208. Note that if another data entry classification is greater than an initial data entry classification for a specific data entry field (and the other data entry classification has also occurred more than "n" times), this other data entry classification will replace the initial data entry classification, and the text prompt will automatically be revised to reflect the new data entry classification for that specific data entry field. The number "n" can be predetermined manually (according to an arbitrary setting made by a user), or it may be based on historical data. In one embodiment, the decision to set the data entry classification can be made on a percentage, rather than a raw number. That is, if a certain percentage of users (e.g., more than 90%) enter a particular type of data for a data entry field, then that type of data is deemed to be the data entry classification for that data entry field. Alternatively, when using an LDAP server (e.g., when accessing the LDAP 314 in proxy server 306), the proxy server 306 may read the appropriate attribute from the user's LDAP entry and enter this attribute as a default value in the webpage 206 before sending the webpage 206 from the service provider's computer 304 to the user's computer 302.

The entered data that was intercepted by the proxy server is then forwarded on to the service provider's computer (block 414), allowing the user's transaction to continue. As soon as all of the data entry fields in the webpage have been examined and evaluated by the proxy server (query block 416), the process ends (terminator block 418).

As described herein, by evaluating the data entries to determine the data entry classifications for each data entry field, and by counting the occurrences of a particular data entry classification for a particular data entry field, and be determining that the particular data entry classification has occurred more than a predetermined number of times, a presumption can be made that data for that particular data entry field should be of that particular data entry classification. This allows an automatic generation of a prompt that tells the customer what type of data should be entered in a particular data entry field, thus ensuring uniformity in data entries. This also allows the insertion of a reasonable default value that most (future, subsequent) users will be able to use as their own.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any stricture, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implemented method of automatically defining a data entry classification of a data entry field on a webpage in a website, the computer-implemented method comprising:
   intercepting, at a proxy server, a data entry for a data entry field in a first instance of the webpage, wherein the data entry was entered at a first computer of a plurality of computers coupled to the proxy server, and wherein the first instance of the webpage is provided to the first computer by a service provider, wherein the data entry field in the first instance of the webpage is not accompanied by a prompt;
   determining, at the proxy server, a data entry classification for the data entry field based on the data entry;
   in response to determining the data entry classification, incrementing, at the proxy server, a total count of instances of the data entry classification for the data entry field based on previous data entries for the data field in the webpage by the plurality of computers;
   intercepting, by the proxy server, a second instance of the webpage, wherein the webpage is requested by a second computer of the plurality of computers coupled to the proxy server;
   determining that the total count of instances exceeds a predetermined threshold;
   in response to determining that the total count of instances satisfies the predetermined threshold, automatically generating a prompt for the data entry field that alerts a user to populate the data entry field with a type of data that comports with the data entry classification;
   modifying the second instance of the webpage to include the prompt that tells the user to populate the data entry field with a type of data that comports with the data entry classification; and
   transmitting the modified second instance of the webpage to the second computer.

2. The computer-implemented method of claim 1, further comprising:
   reiterating the intercepting, incrementing, determining, and transmitting steps for all other data entry fields in the webpage.

3. The computer-implemented method of claim 1, further comprising:
   transmitting the data entry from the proxy server to the service provider.

4. The computer-implemented method of claim 1, further comprising:
   wherein determining the data entry classification is performed by comparing the data entry with data that has been previously stored in fields in a Lightweight Directory Access Protocol (LDAP) entry for a user of the first computer;
   incrementing the total count of instances of the data entry classification each time the data entry classification is used by another accessing computer for the data entry field.

5. The computer-implemented method of claim 4, further comprising:
   providing the second computer with a default data entry classification for data to be entered in the data entry field in the second instance of the webpage, wherein the default data entry classification is based on the LDAP entry for the first computer, and wherein the LDAP entry for the first computer also describes attributes for the second computer.

6. A system comprising:
   a processor;
   a data bus coupled to the processor;
   a memory coupled to the data bus; and
   a computer-usable medium embodying computer program code, the computer program code comprising instructions executable by the processor and configured for automatically defining a data entry classification of a data entry field on a webpage in a website by:
   intercepting, at a proxy server, a data entry for a data entry field in a first instance of the webpage website, wherein the data entry was entered at a first computer of a plurality of computers coupled to the proxy server, and wherein the first instance of the webpage website is provided to the first computer by a service provider, wherein the data entry field in the first instance of the webpage is not accompanied by a prompt;

determining, at the proxy server, a data entry classification for the data entry field based on the data entry;

in response to determining the data entry classification, incrementing, at the proxy server, a total count of instances of the data entry classification for the data entry field based on previous data entries for the data field in the webpage website by the plurality of computers;

intercepting, by the proxy server, a second instance of the webpage, wherein the webpage is requested by a second computer of the plurality of computers coupled to the proxy server;

determining that the total count of instances satisfies exceeds a predetermined threshold;

in response to determining that the total count of instances satisfies the predetermined threshold, automatically generating a prompt for the data entry field that alerts a user to populate the data entry field with a type of data that comports with the data entry classification;

modifying the second instance of the webpage to include the prompt that alerts tells the user to populate the data entry field with a type of data that comports with the data entry classification; and transmitting the modified second instance of the webpage to the second computer.

7. The system of claim 6, wherein the instructions are further configured for:

reiterating the intercepting, incrementing, determining, and transmitting steps for all other data entry fields in the webpage.

8. The system of claim 6, wherein the instructions are further configured for:

transmitting the data entry from the proxy server to the service provider.

9. The system of claim 6, wherein:

determining the data entry classification is performed by comparing the data entry with data that has been previously stored in fields in a Lightweight Directory Access Protocol (LDAP) entry for a user of the first computer; and the instructions are further configured for incrementing the total count of instances of the data entry classification each time the data entry classification is used by another accessing computer for the data entry field.

10. The system of claim 9, wherein the instructions are further configured for:

providing the second computer with a default data entry classification for data to be entered in the data entry field in the second instance of the webpage, wherein the default data entry classification is based on the LDAP entry for the first computer, and wherein the LDAP entry for the first computer also describes attributes for the second computer.

11. A computer program product for automatically defining a data entry classification of a data entry field on a webpage in a website, the computer program product comprising a tangible computer usable storage device having computer usable program code stored therein, which is executable for performing the functions of:

intercepting, at a proxy server, a data entry for a data entry field in a first instance of the webpage website, wherein the data entry was entered at a first computer of a plurality of computers coupled to the proxy server, and wherein the first instance of the webpage website is provided to the first computer by a service provider, wherein the data entry field in the first instance of the webpage is not accompanied by a prompt;

determining, at the proxy server, a data entry classification for the data entry field based on the data entry;

in response to determining the data entry classification, incrementing, at the proxy server, a total count of instances of the data entry classification for the data entry field based on previous data entries for the data field in the webpage website by the plurality of computers;

intercepting, by the proxy server, a second instance of the webpage, wherein the webpage is requested by a second computer of the plurality of computers coupled to the proxy server;

determining that the total count of instances satisfies exceeds a predetermined threshold;

in response to determining that the total count of instances satisfies the predetermined threshold, automatically generating a prompt for the data entry field that alerts tells a user to populate the data entry field with a type of data that comports with the data entry classification;

modifying the second instance of the webpage to include the prompt that alerts the user to populate the data entry field with a type of data that comports with the data entry classification; and transmitting the modified second instance of the webpage to the second computer.

12. The computer program product of claim 11, wherein the computer usable program code further comprises:

computer usable program code configured to reiterate the intercept, increment, determine, and transmit steps for all other data entry fields in the webpage.

13. The computer program product of claim 11, wherein the computer usable program code further comprises:

computer usable program code configured to transmit the data entry from the proxy server to the service provider.

14. The computer program product of claim 11, wherein:

determining the data entry classification is performed by computer usable program code for comparing the data entry with data that has been previously stored in fields in a Lightweight Directory Access Protocol (LDAP) entry for a user of the first computer; and the computer usable program code further comprises program code configured for incrementing the total count of instances of the data entry classification each time the data entry classification is used by another accessing computer for the data entry field.

15. The computer program product of claim 14, wherein the computer usable program code further comprises:

computer usable program code configured to provide the second computer with a default data entry classification for data to be entered in the data entry field in the second instance of the webpage, wherein the default data entry classification is based on the LDAP entry for the first computer, and wherein the LDAP entry for the first computer also describes attributes for the second computer.

* * * * *